(12) United States Patent
Villaron et al.

(10) Patent No.: US 7,568,182 B2
(45) Date of Patent: Jul. 28, 2009

(54) METHOD AND SYSTEM FOR CONTROLLING SOFTWARE TO FACILITATE CROSS-VERSION COLLABORATION OF FILES

(75) Inventors: Shawn Alan Villaron, San Jose, CA (US); Brian Jones, Redmond, WA (US); Chad Rothschiller, Edmonds, WA (US); Robert Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 11/018,571

(22) Filed: Dec. 20, 2004

(65) Prior Publication Data

US 2006/0136432 A1     Jun. 22, 2006

(51) Int. Cl.
G06F 9/44     (2006.01)
(52) U.S. Cl. ...................................... 717/121
(58) Field of Classification Search ............... 717/101, 717/106, 110, 114, 116, 120–122, 136, 137, 717/168, 174
See application file for complete search history.

(56) References Cited

U.S. PATENT DOCUMENTS

| | | | | |
|---|---|---|---|---|
| 5,339,435 A * | 8/1994 | Lubkin et al. | ............... | 717/121 |
| 5,652,876 A * | 7/1997 | Ashe et al. | ................... | 703/26 |
| 6,775,829 B1 * | 8/2004 | Kroening | .................... | 717/175 |
| 6,947,162 B2 * | 9/2005 | Rosenberg et al. | ......... | 358/1.15 |
| 7,278,134 B2 * | 10/2007 | Ricke | ......................... | 717/123 |
| 2002/0100017 A1 * | 7/2002 | Grier et al. | .................. | 717/120 |
| 2002/0143794 A1 * | 10/2002 | Helt | ........................... | 707/200 |
| 2003/0119386 A1 | 6/2003 | Laux et al. | .................. | 439/894 |
| 2003/0159035 A1 | 8/2003 | Orthleib et al. | ............. | 713/168 |
| 2003/0195899 A1 | 10/2003 | Tsao | ....................... | 707/104.1 |
| 2004/0103393 A1 * | 5/2004 | Reddy et al. | ................ | 717/122 |
| 2004/0133846 A1 | 7/2004 | Khoshatefeh et al. | ....... | 715/500 |

OTHER PUBLICATIONS

Eeckhout et al. "How Java Programs Interact with Virtual Machines at the Microarchitectural Level", Oct. 2003, ACM, pp. 169-186.*
Bunt et al. "What role can adaptive support play in an adaptable system?" Jan. 2004, ACM, pp. 117-124.*
Ait-Ameur et al. "Robustness Analysis of Avionics Embedded Systems", Jul. 2003, ACM, pp. 123-132.*
"Mactopia: Are your documents compatible? Check for it!", http://www.microsoft.com/mac/includes/print_friendly. aspx?embFName=/mac/LIBAR . . . , printed Jul. 18, 2006, 2 pp.
"Microsoft Office Online: Convert Documents Between PDF and Word", http://office.microsoft.com/en-us/assistance/ HA011683331033.aspx?mode=print, printed on Jul. 18, 2006, 1 p.

(Continued)

*Primary Examiner*—Wei Y Zhen
*Assistant Examiner*—Anna Deng
(74) *Attorney, Agent, or Firm*—Merchant & Gould

(57) ABSTRACT

Methods and systems are provided for controlling elements of computing systems including operating systems, software applications and different versions of software applications to better facilitate cross-application and cross-version collaboration of files. Elements within a computing system, for example, operating systems, applications, or particular versions of an application, are reconfigured at application start time or document start time so that individual elements may interact with existing files of an otherwise different computing system or such that individual elements may generate or edit files targeted at otherwise different computing systems.

20 Claims, 5 Drawing Sheets

OTHER PUBLICATIONS

"PPT: How to Bring Harvard Graphics Slides into PowerPoint", http://support.microsoft.com/kb/141604/en-us, Rev. 2.1, Aug. 17, 2005, printed on Jul. 18, 2006, 1 p.

"WD97: Description of the Compatibility Tab in Options Dialog Box for Word 97", http://support.microsoft.com/kb/166016/en-us, Revision 1., Jan. 23, 2002, printed on Jul. 18, 2006, 4 pp.

International Search Report in EP36931NN904awe, Microsoft 309876.02, dated Jan. 14, 2008, Extended European Search Report according to Rule 44a EPC, European Patent Application No. 05 111 553.3.

European Communication dated Apr. 24, 2008 cited in EP Application No. 05111553.3-1243.

* cited by examiner

METHOD AND SYSTEM FOR CONTROLLING SOFTWARE TO FACILITATE CROSS-VERSION COLLABORATION OF FILES

FIELD OF THE INVENTION

The present invention generally relates to collaborative use of disparate computing and software systems. More particularly, the present invention relates to methods and systems for controlling software to facilitate cross-application and cross-version collaboration of files.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modem spreadsheet applications allow users to enter, manipulate, and organize data. Modem electronic slide presentation applications allow users to create a variety of slide presentations containing text, pictures, data and other useful objects.

As society continues to embrace computers and computer software at an ever-increasing rate, the computing world has become a fragmented heterogeneous system made up of computers running a multitude of different operating systems, applications and versions of applications. Each element within a single computing system (for example, operating system, applications and different versions of applications) has differences in user interface, features/functionality, application program interfaces and file formats. The differences between these elements cause problems when two or more users from different computing systems attempt to collaborate. For example, when one user from one computing system using a second generation or second version of a given software application creates or edits a document intended for a first or former version of the same software application, features or functionalities available on the later version of the software application may apply properties to the document that may not be compatible with available functionalities or features available to the earlier version of the software application.

Typical problems the average user encounters include a failure to open a file received from a different computing system, a failure to save a file intended for use in a different computing system without file degradation, visual and content changes or loss when consuming a file on a different computing system from the computing system on which the file was created or edited, and programmatic errors when trying to consume a file on a different computing system from the computing system on which the file was created or edited. Prior solutions to these problems fail to mitigate most of the potential problems users can expect. Further, prior solutions often are deployed when a user is no longer in a position to easily identify or fix the offending component of a file. Examples of such solutions include compatibility checkers, translators, and converters.

Accordingly, there is a need for a method and system for improving the control of software applications and components of computing systems to facilitate better cross-application and cross-version collaboration of files. It is with respect to these and other considerations that the present invention has been made.

SUMMARY OF THE INVENTION

Embodiments of the present invention solve the above and other problems by providing methods and systems for controlling elements of computing systems including operating systems, software applications, and different versions of software applications to better facilitate cross-application and cross-version collaboration of files. Generally described, according to embodiments of the present invention, elements within a computing system, for example operating systems, applications, or particular versions of an application, are reconfigured so that individual elements may interact with existing files of an otherwise different computing system or such that individual elements may generate files targeted at otherwise different computing systems.

According to one embodiment of the present invention, a given element of a computing system is constrained such that as the element is used, functionality available to the element that may cause cross-application or cross-version collaboration problems is disabled or otherwise is made unavailable for use in creating or editing a file that is intended for a different type or different version of the computing system element. According to this embodiment, an element of the computing system may be constrained according to a spectrum of constraints where on one end of the spectrum the application or element is completely disallowed from performing editing functions on a given file. At the other end of the spectrum, the application or element may be configured or constrained so that a particular set of features of functionalities of the application are disabled according to a profile applied to the application or element for enabling or disabling certain features or functionalities of the application or element so as to prevent cross-application or cross-version problems between the application or element and a different application or element of the same type or from a different version of the same application or element.

According to another embodiment, a computing system or elements of a computing system may be configured in a particular way that is optimized for general needs of a given user or group of users, but when a file is encountered by the computing system from a different computing system, the first computing system may automatically offer to reconfigure itself for consuming the file so as to avoid cross-application or cross-version collaboration problems. According to this embodiment, one or more compatibility configurations may be loaded by the application or element being used to create or edit a file for configuring the application or element to prevent cross-application or cross-version problems.

According to another embodiment, once a computing system element has been configured with a set of feature and/or functionality limitations for preventing cross-application or cross-version problems, the computing system element may nonetheless be returned to full utility by removing the cross-application or cross-version configurations applied to the computing system element.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As briefly described above, embodiments of the present invention are directed to methods and systems for controlling elements of a computing system, for example operating systems, software applications, or different versions of software applications to facilitate improved cross-application and cross-version collaboration of files. According to embodiments of the present invention, features and/or functionalities or other configurations of an element of a computing system may be modified to allow a given element of the computing system to create, edit or otherwise operate on a file or document in a manner that allows a different computing system element, different software application, or a different version of the same software application to receive and use the file or document without the problems normally associated with incompatible computing systems or incompatible computer system elements, or associated with different versions of a same software application as set out above in the background section. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
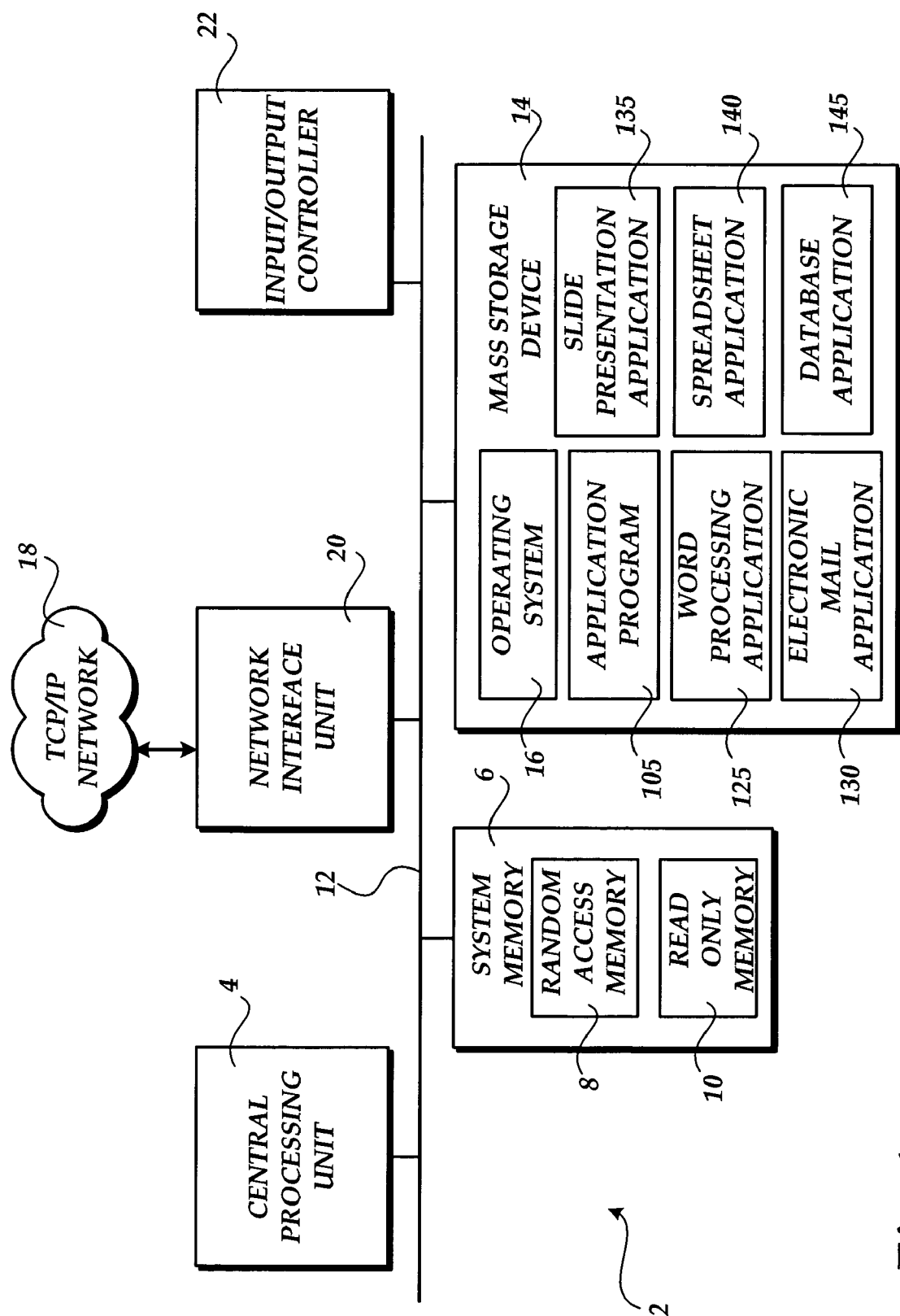
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application suite for providing functionality from a number of different software applications. Some of the individual program modules that may comprise the multiple functionality application suite 105 include a word processing application 125, a slide presentation application 135, a spreadsheet application 140 and a database application 145. An example of such a multiple functionality application suite 105 is OFFICE manufactured by Microsoft Corporation. Other software applications illustrated in FIG. 1 include an electronic mail application 130.

According to embodiments of the present invention, elements of a given computing system, for example an operating system, a given software application, or a particular version of a given software application, configure themselves so that they can interact with existing files of an otherwise different system or such that they can generate files targeted at the otherwise different computing system. Configuration modifications utilized by elements of a computing system according to embodiments of the present invention include configuration modifications at a variety of levels including user interfaces, features/functionalities, application program interface (API) sets and file format support.

According to one embodiment of the invention, configuration of an application for improved cross-application or cross-version collaboration may be performed at application load time. As should be understood, cross-application collaboration may include collaboration on documents or files on two different applications of the same type, for example, two word processing applications manufactured by different companies. Cross-version collaboration may include collaboration on documents or files on two versions (e.g., 2003 version versus 2004 version) of the same software application.

When a given application loads, the application may pick up appropriate configurations and apply those configurations relative to a different application or different version of the same application to which documents or files created or edited by the first application are intended. For example, if a first application includes a word processing application provided by a first software company is to be used for generating documents directed to an organization that operates a second word processing application provided by a second software company, compatibility configurations may be necessary for the first software application in order to generate documents or files that may be utilized by the organization operating the second software application without file or document degradation associated with incompatibility problems between the two software applications. For example, the first software application may allow formatting functionalities that are not allowed or available by the second software application. Accordingly, a set of compatibility configurations may be constructed and applied to the first application that will disable functionality provided by the first software application while the first application is being used to generate or edit files intended for use on the second software. In effect, a given compatibility configuration setting operates as a profile of the computing system element to which a document or file is intended for allowing a creating or editing application to create or edit documents for use on an otherwise different or incompatible computing system or computing system element.

Figure 2:
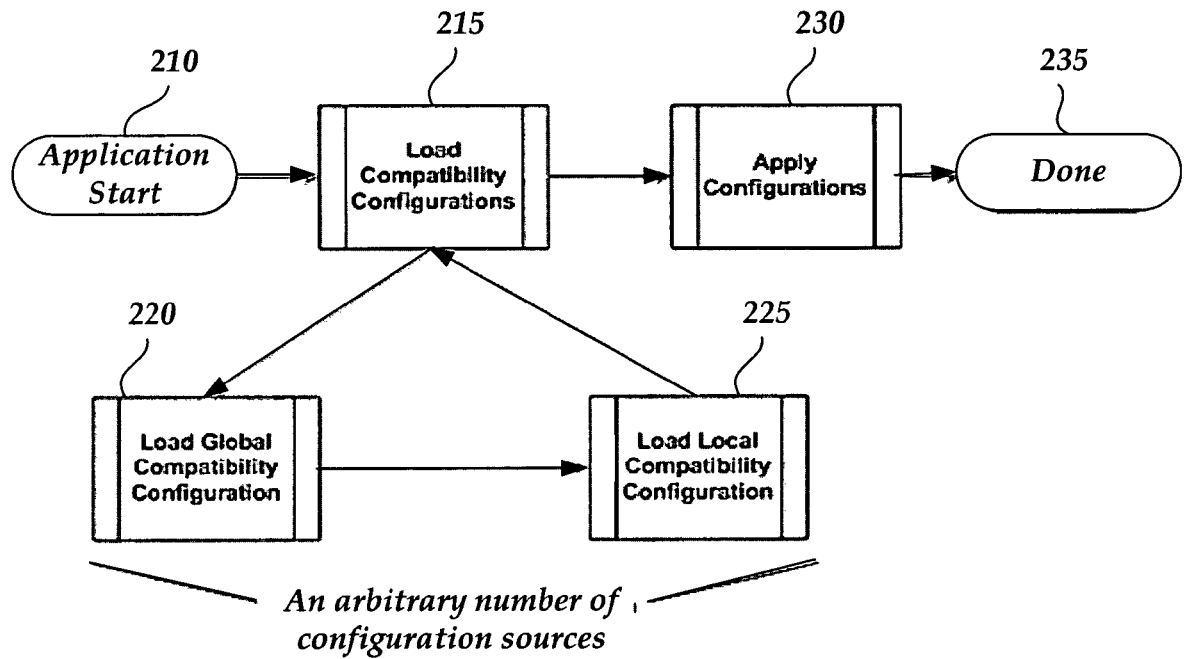
FIG. 2 is a flow diagram illustrating steps performed by a method and system of the present invention for loading compatibility configurations onto a computing system element for preventing cross-application or cross-version problems according to embodiments of the present invention.

FIG. 2 is a flow diagram illustrating steps performed by a method and system of the present invention for loading compatibility configurations at application load time onto a computing system element for preventing cross-application or cross-version collaboration problems. At block 210 a first application is started. At block 215, compatibility configurations for reconfiguring the first application for creating or editing a document or file intended for the second application are loaded onto the first application. For example, when the first application is started, a functionality button or control may be provided in a user interface associated with the first application to allow the user to select compatibility configurations for configuring the first application for use in association with a variety of different applications including the example second software application described above. According to one embodiment of the present invention, a list of compatibility configurations may be provided to a user at application load time, and a prompt may be provided to alert the user of available compatibility configurations. Upon selection of the desired application for which the first application is to be configured, compatibility configurations associated with the second application are loaded onto the first application.

When the application loads, and when a particular compatibility configuration is selected, the configuration may be taken from a variety of sources. As illustrated at block 220, a global compatibility configuration may be set onto the first application for applying a standard set of compatibility configurations to the first application. For example, the global compatibility configuration may be a configuration determined by an organization's computing system administrator for configuring all computing systems for generating or editing documents or files according to a set compatibility configuration if those documents or files created by all computing systems in the organization are directed to persons or organizations operating a different computing system or computing system element for which the compatibility configurations are required.

Alternatively, as illustrated at block 225, local compatibility configurations may be applied to the first application whereby the compatibility configurations may be customizable by the end user of the first application. For example, if a particular user in an organization knows that a document created or edited on his/her local computing system is to be utilized by another user having a different software application of the same type as the first software application (e.g., word processing application), or operating a different version of the same software application, then a local compatibility configuration may be applied to the first application whereby the end user of the first application sets customized compatibility configurations on the first application. A user interface button may be provided for displaying a menu of compatibility configurations that may be set by the end user. For example, the end user may be allowed to disable particular functionalities or features such as formatting options and the like. Once the global or local compatibility configurations are loaded at block 215, at block 230 the configurations are applied to the application, and the routine ends at block 235.

Figure 3:
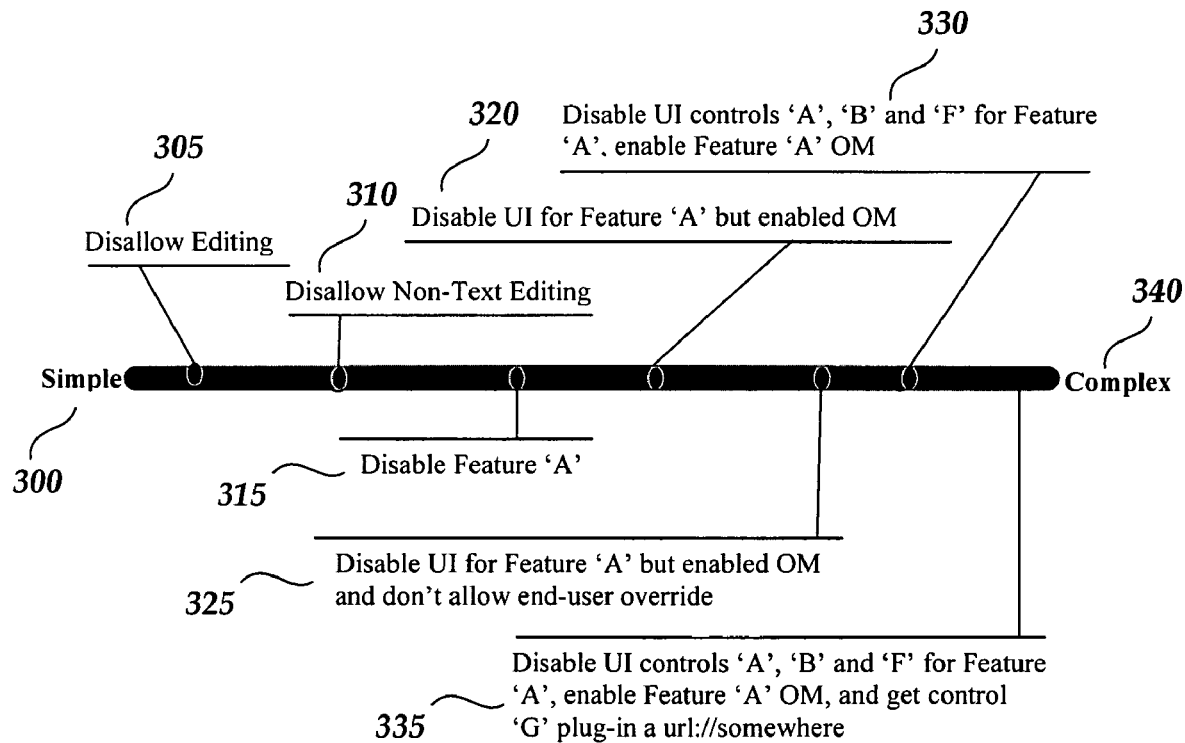
FIG. 3 is a diagram illustrating a spectrum of configuration changes applicable to a computing system element for preventing cross-application or cross-version problems according to embodiments of the present invention.

Referring now to FIG. 3, a compatibility configuration or profile applied to a computing system element may range from simple modifications to the features/functionalities of the computing system element to very complex configuration modifications. As shown in FIG. 3, on the simple end 300 of the configuration spectrum, simple configuration settings may be applied, for example disallowing all editing by a given computing system element. At position 310 on the spectrum, an example configuration is shown of disallowing only non-text editing. At position 330 on the spectrum, a configuration is shown for disabling user interface controls A, B and F for feature A, but enabling a feature A object model. At position 335 on the spectrum, a configuration setting is shown for disabling user interface controls A, B and F of feature A, enabling feature A object model and obtaining a control G plug-in at a particular online location. As should be understood, the configuration settings illustrated at FIG. 3 are for purposes of example only and are not limiting of the variety of different configuration settings that may be applied to a computing system element.

According to another embodiment of the present invention, compatibility configurations may be applied to a computing system element, for example a software application, a particular version of the software application, operating system, and the like, upon the loading of a particular file or document for editing or other processing. According to this embodiment, when a particular document or file is launched using a given application, a determination may be made that a compatibility configuration should be applied to the application so that edits or other processing performed on the document or file will be compatible with other applications or versions of the same application for which the document or file is intended. For example, if a user attempts to open a file generated on an older version of a software application using a later version of the same software application, the user may desire to apply a compatibility configuration to the later version of the software application such that edits made to the document or file will not create compatibility problems when the document or file is subsequently opened using the older version of the software application.

Figure 4:
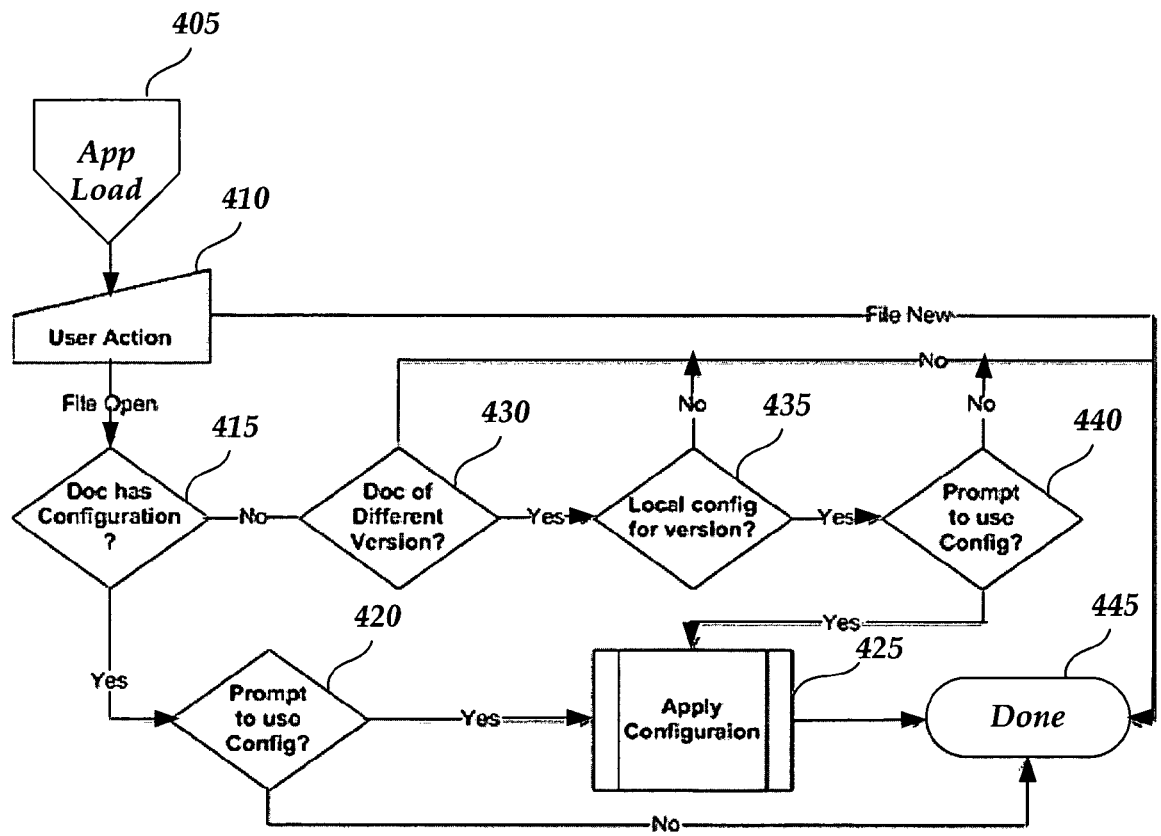
FIG. 4 is a flow diagram illustrating steps performed by a method and system of the present invention for applying a cross-application or cross-version configuration to a computing system element when a file is loaded by the computing system element for creation or editing according to embodiments of the present invention.

Referring to FIG. 4, at block 405, the application is use (e.g., later version) is loaded. At block 410, the user performs some action such as opening an existing file or document, or opening a new file or document. If the user opens a new file or document, the routine proceeds to block 445, and no compatibility configurations are applied to the software application in use because no existing document or file is being edited that may have been generated or previously edited by a different software application or by a different version of the same software application. As should be understood, if the user knows that the new file or new document is to be generated for use by a different application or different application version, the user may apply a compatibility configuration to the application at application load time as described above with reference to FIGS. 2 and 3.

Referring still to FIG. 4, if an existing file or document is being opened, the routine proceeds to block 415, and a determination is made as to whether the file or document has an associated compatibility configuration. For example, a determination is made as to whether the document or file was generated by another application to which a compatibility configuration was applied at the time the document or file was generated as described above with reference to FIGS. 2 and 3. As should be understood, properties may be associated with a document or file which identify attributes (e.g., application type, name, version, compatibility configuration, etc.) of an application used for generating or editing the document or file.

If the document is associated with a particular compatibility configuration, the routine proceeds to block 420, and the user is prompted to use the same compatibility configuration on the computing system element or application currently in use. If the user does not wish to utilize the proposed compatibility configuration, the routine proceeds to block 445, and the user may edit the document or file according to the functionality/feature configurations associated with the in-use application. If the user does desire to apply the proposed compatibility configuration, the routine proceeds to block 425, and the proposed compatibility configuration is applied to the computing system element or application. As should be understood, the proposed compatibility configuration may be provided to the user in a user interface element such as a pop-up dialog, drop-down menu, and the like. Alternatively, when a particular document or file is launched on a given application, a list of compatibility configurations may be provided for configuring the application relative to configurations applied to a previous or other application used for generating or editing the document or file.

Referring back to block 415, if the document or file is not associated with a given compatibility configuration, the routine proceeds to block 430, and a determination is made as to whether the document or file was generated by a different version of the same software application in use. If not, the routine proceeds to block 445, and the software application or other computing system element may be utilized without the application of a given or customized compatibility configuration. If a determination is made that the document or file was generated or edited using a software application of a different version, the routine proceeds to block 435, and a determination is made as to whether a compatibility configuration is available for configuring the software application is use for generating or editing a document or file for use by a different version of the software application.

If no compatibility configuration is available, the routine proceeds to block 445, and the user may decide to continue with edits to the document or file without regard to potential compatibility problems that may be caused by generating or editing the document with the application version in use. If a configuration is available, the routine proceeds to block 440, and the user may be prompted to load the available compatibility configuration. If the user accepts the proposed compatibility configuration, the routine proceeds to block 425, and the proposed compatibility configuration is applied to the application in use. The routine then proceeds to block 445, and the reconfigured application may be utilized for editing the document or file.

Figure 5:
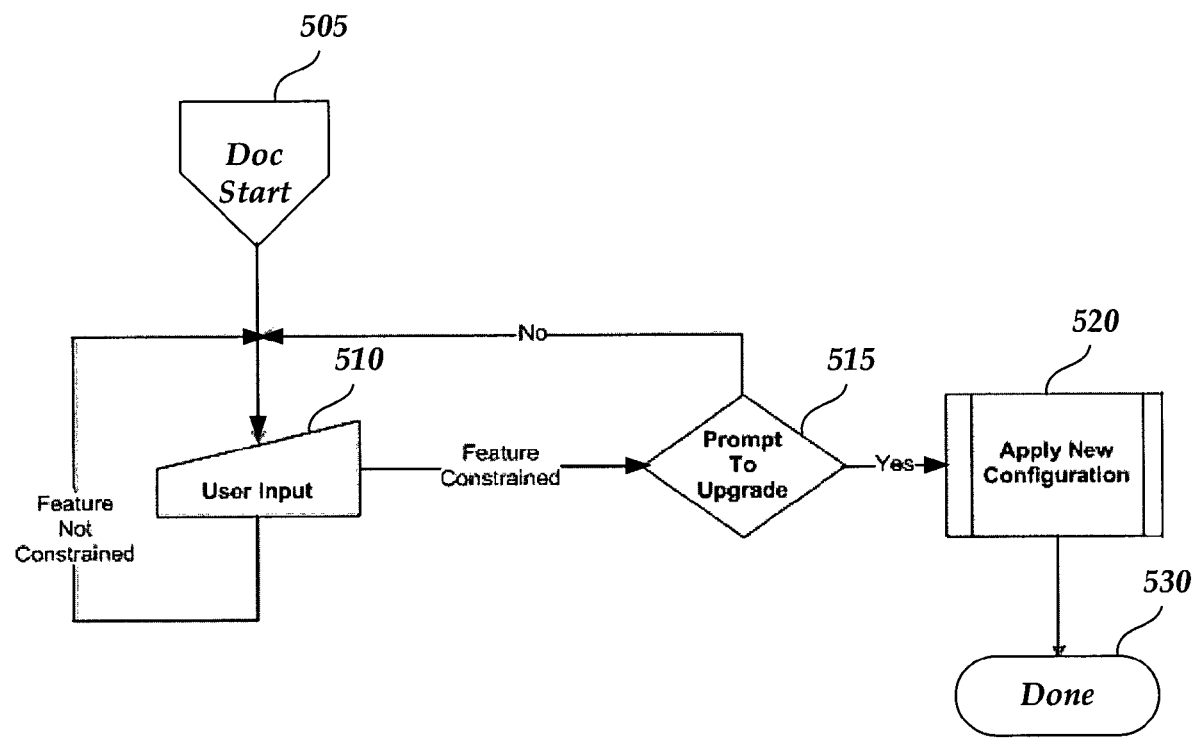
FIG. 5 is a flow diagram illustrating steps performed by a method and system of the present invention for upgrading cross-application or cross-version configurations applied to an element of a computing system according to embodiments of the present invention.

In some cases, a user may desire to upgrade the configurations of a given computing system element to remove or modify constraints placed on features or functionalities of a given element. Or, a user may desire to remove altogether a configuration applied to an application at application load time or in association with a loaded file or document. FIG. 5 is a flow diagram illustrating steps performed by a method and system of the present invention for upgrading cross-application or cross-version configurations applied to an element of a computing system. Referring to FIG. 5, a user may upgrade or remove configurations at document start time or at application load time.

At block 505, when a particular document or file is loaded, or when an application is loaded or started, the routine proceeds to block 510. At block 510, a user input is received, for example selection of a feature or functionality for application to a document or file. If the feature or functionality selected by the user is not constrained by an applied compatibility configuration, the routine loops back around to block 510, and subsequent user inputs are received. If the feature selected by the user is constrained by an applied compatibility configuration, the routine proceeds to block 515, and a prompt may be provided to the user to allow the user to upgrade the compatibility configurations applied to the application so that the user may indeed utilize the desired feature of functionality. That is, the previously applied compatibility configuration which disallows use of the selected feature or functionality may be changed so that the compatibility configuration is upgraded to allow selection and use of the otherwise constrained feature.

If the user decides not to upgrade the compatibility configurations to allow use of the selected feature or functionality, the routine proceeds back to block 510 for the next user input. On the other hand, if the user decides to upgrade the compatibility configuration to allow use of the selected feature or functionality, the routine proceeds to block 520, and a new compatibility configuration is applied to the software application in use to allow for selection and use of the desired feature or functionality. The routine ends at block 530.

As described herein, methods and systems are provided for controlling computing system elements for facilitating improved cross-application or cross-version collaboration of files and documents. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer storage medium having stored thereon computer-executable instructions which when executed by a computer perform a method of modifying a plurality of features and functionalities of at least one software application to facilitate document compatibility, the method executed by the computer-executable instructions comprising:

launching a first software application for preparing a document for use by a second software application;

determining whether a global compatibility configuration is configured for the first software application, wherein the global compatibility configuration comprises a set of compatibility configurations to be applied to a plurality of users of the first software application;

in response to determining that the global compatibility configuration is configured for the first software application:

applying the global compatibility configuration to the first software application, and configuring the first software application so that the document prepared by the first application is in accordance with the global compatibility configuration;

determining whether a first set of features and functionalities of the first application that are operative to be applied to the document are incompatible with a second set of features and functionalities available from the second software application;

in response to determining whether the first set of features and functionalities of the first application that are operative to be applied to the document are incompatible with a second set of features and functionalities available from the second software application, providing a list of a plurality of compatibility configurations from which at least one compatibility configuration is selected for configuring the first software application, wherein the plurality of compatibility configurations are provided for configuring the first software application relative to configurations previously applied to the first software application used for one of generating the document and editing the document; and configuring the first software application so that incompatible features and functionalities of the first set of features and functionalities of the first software application are not applied to the document.

2. The computer storage medium of claim 1, wherein launching the first software application for preparing the document for use by the second software application includes launching a first version of the first software application for preparing a document for use by a second version of the first software application.

3. The computer storage medium of claim 1, wherein determining whether the first set of features and functionalities of the first software application that that are operative to be applied to the document are incompatible with the second set of features and functionalities available from the second software application includes identifying the second software application and identifying the first set of features and functionalities of the first software application that are operative to be applied to the document that are incompatible with the second set of features and functionalities from the second software application.

4. The computer storage medium of claim 1, prior to configuring the first software application so that the incompatible features and functionalities of the first set of features and functionalities of the first software application that are operative to be applied to the document can not be applied to the document, further comprising receiving a selection of the at least one compatibility configuration for configuring the first software application.

5. The computer storage medium of claim 4, wherein receiving the selection of the at least one compatibility configuration for configuring the first software application includes receiving a selection of a customized compatibility configuration for configuring the first software application, the customized compatibility configuration constraining at a selection of the first set of features and functionalities of the first software application.

6. The computer storage medium of claim 5, prior to receiving the selection of the customized compatibility configuration for configuring the first software application, receiving a selection of at least one feature and functionality of the first set of features and functionalities to be constrained from use by the first software application for generating the customized compatibility configuration.

7. The computer storage medium of claim 6, prior to receiving the selection of the at least one feature and functionality of the first set of features and functionalities to be constrained from use by the first software application for generating the customized compatibility configuration, providing in a user interface a listing of the first set of features and functionalities of the first software application that are operative to be constrained from use by the first software application for generating the customized compatibility configuration.

8. The computer storage medium of claim 4, wherein configuring the first software application includes constraining the incompatible features and functionalities of the first set of features and functionalities of the first software application that are operative to be applied to the document and that are incompatible with the second set of features and functionalities available from the second software application.

9. The computer storage medium of claim 8, wherein constraining the incompatible features and functionalities of the first set of features and functionalities of the first software application includes disabling the constrained features and functionalities from use by the first software application.

10. The computer storage medium of claim 8, wherein constraining the incompatible features and functionalities of the first set of features and functionalities of the first software application includes modifying an operation of the constrained features and functionalities such that the modified features and functionalities are compatible with the second set of features and functionalities available from the second software application.

11. The computer storage medium of claim 1, further comprising:
   after configuring the first software application so that the incompatible features and functionalities of the first set of features and functionalities of the first software application that are operative to be applied to the document cannot be applied to the document, receiving a selection of a feature and functionality of the first set of features and functionalities of the first software application that are not to be applied to the document in response to configuring the first software application;
   providing a prompt that a compatibility configuration applied to the first software application is available for an upgrade to allow application of the selected feature and functionality to the document; and
   upgrading the compatibility configuration applied to the first software application to allow application of the selected feature and functionality to the document.

12. A method of modifying the features and functionalities of a software application to facilitate improved document compatibility with other software applications, the method comprising:
   launching a first software application for preparing a computer-generated document;
   opening the computer-generated document with the first software application;
   determining whether a global compatibility configuration is configured for the first software application, wherein the global compatibility configuration comprises a set of compatibility configurations to be applied to a plurality of users of the first software application;
   in response to determining that the global compatibility configuration is configured for the first software application:
      applying the global compatibility configuration to the first software application, and
      configuring the first software application so that the computer-generated document prepared by the first software application is in accordance with the global compatibility configuration;
   determining whether the document was generated by a second software application;
   in response to determining whether the document was generated by the second software application, determining whether at least one compatibility configuration of a plurality of compatibility configurations for defining at least one feature and functionality of a first set of features and functionalities available from the second software application is available to the first software application;
   in response to determining that the at least one compatibility configuration of the plurality of compatibility configurations for defining at least one feature and functionality of a first set of features and functionalities available from the second software application is available to the first software application, providing a list of the plurality of compatibility configurations from which the at least one compatibility configuration is selected for configuring the first software application, wherein the plurality of compatibility configurations are provided for configuring the first software application relative to configurations previously applied to the second software application used for generating the document; and
   applying the at least one compatibility configuration for defining at least one feature and functionality of a first set of features and functionalities available from the second software application to the first software application.

13. The method of claim 12, prior to applying the at least one compatibility configuration available to the first software application, receiving a selection for applying the available at least one compatibility configuration to the first software application.

14. The method of claim 13, prior to receiving the selection for applying the available at least one compatibility configuration to the first software application, providing a prompt for application to the first software application of a predetermined compatibility configuration configured for the first software application.

15. The method of claim 12, wherein determining whether at least one compatibility configuration of the set of compatibility configurations for defining at least one feature and functionality of a first set of features and functionalities available from the second software application is available to the first software application comprises:
   determining whether the computer-generated document comprises at least one property defining at least one associated compatibility configuration.

16. The method of claim 12, further comprising:
   receiving a selection of a feature and functionality of a second set of features and functionalities of the first software application for application to the computer-generated document, and determining whether use of the selected feature and functionality is constrained according to the at least one compatibility configuration applied to the first software application.

17. The method of claim 12, further comprising:
   after applying the at least one compatibility configuration to the first software application, receiving a selection of a feature and functionality of a second set of features and functionalities of the first software application that is not to be applied to the document after applying the at least one compatibility configuration to the first software application;
   providing a prompt that the at least one compatibility configuration applied to the first software application is available for an upgrade to allow application of the selected feature and functionality to the computer-generated document; and
   upgrading the at least one compatibility configuration applied to the first software application to allow application of the selected feature and functionality to the computer-generated document.

18. A computer storage medium having stored thereon computer-executable instructions which when executed by a computer perform a method of modifying a plurality of features and functionalities of at least one software application to facilitate document compatibility, the method executed by the computer-executable instructions comprising:
   launching a first software application for preparing a computer-generated document;

opening the computer-generated document with the first software application;

determining whether a global compatibility configuration is configured for the first software application, wherein the global compatibility configuration comprises a set of compatibility configurations to be applied to a plurality of users of the first software application;

in response to determining that the global compatibility configuration is configured for the first software application:

applying the global compatibility configuration to the first software application, and configuring the first software application so that the document prepared by the first software application is in accordance with the global compatibility configuration;

determining whether the document was generated by a second software application;

in response to determining that the document was generated by the second software application, determining whether the document comprises at least one property defining at least one associated compatibility configuration of a plurality of compatibility configurations defining features available from the second software application;

in response to determining that the document comprises the at least one property defining the at least one associated compatibility configuration defining features available from the second software application, providing a list of the plurality of compatibility configurations from which the at least one associated compatibility configuration is selected for configuring the first software application, wherein the plurality of compatibility configurations are provided for configuring the first software application relative to configurations previously applied to the second software application used for generating the document; and applying the selected at least one compatibility configuration to the first software application.

19. The computer storage medium of claim 18, further comprising if the document does not comprise the at least one property defining at least one associated compatibility configuration defining features available from the second software application, determining whether the document was generated by the second software application;

if the document was generated by the second software application, determining whether a first set of features and functionalities available from the first software application that are operative to be applied to the document are incompatible with a second set of features and functionalities available from the second application; and configuring the first software application so that incompatible features and functionalities of the first set of features and functionalities of the first software application cannot be applied to the document.

20. The computer storage medium of claim 1, wherein the plurality of compatibility configurations are further provided for configuring the first software application relative to configurations currently applied to the first software application.

\* \* \* \* \*